US010366409B2

(12) United States Patent
Moseman et al.

(10) Patent No.: US 10,366,409 B2
(45) Date of Patent: Jul. 30, 2019

(54) SYSTEMS AND METHODS FOR USING MOBILE DEVICE LOCATION INFORMATION TO DETERMINE PROXIMITY AND LINE OF SIGHT TO STRUCTURES

(71) Applicants: Cellco Partnership, Arlington, VA (US); Verizon Patent and Licensing Inc., Arlington, VA (US)

(72) Inventors: Kelvin L. Moseman, Flower Mound, TX (US); Anup Kotapalli, Alpharetta, CT (US); Sasidhar V. Ravula, Edison, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 33 days.

(21) Appl. No.: 15/619,381

(22) Filed: Jun. 9, 2017

(65) Prior Publication Data
US 2017/0345051 A1 Nov. 30, 2017

Related U.S. Application Data

(63) Continuation of application No. 14/030,509, filed on Sep. 18, 2013.

(51) Int. Cl.
*G06Q 30/02* (2012.01)
(52) U.S. Cl.
CPC ................ *G06Q 30/0246* (2013.01)
(58) Field of Classification Search
None
See application file for complete search history.

(56) References Cited

U.S. PATENT DOCUMENTS

| 7,814,106 | B2* | 10/2010 | Guido ............... | G06Q 30/0241 |
| | | | | 705/14.4 |
| 8,335,524 | B2* | 12/2012 | Shutter ............... | G06Q 30/02 |
| | | | | 455/456.3 |
| 8,515,450 | B2 | 8/2013 | Wysocki | |
| 2003/0046158 | A1* | 3/2003 | Kratky ............... | G06Q 30/02 |
| | | | | 705/14.58 |
| 2006/0253481 | A1 | 11/2006 | Guido et al. | |
| 2009/0197616 | A1 | 8/2009 | Lewis et al. | |
| 2010/0070988 | A1* | 3/2010 | Cohen ............... | G06K 9/00604 |
| | | | | 725/10 |
| 2011/0035282 | A1* | 2/2011 | Spatscheck ............ | G06Q 30/02 |
| | | | | 705/14.58 |

(Continued)

OTHER PUBLICATIONS

Qingquan Li et al; "Intersection detection and recognition for autonomous urban driving using a virtual cylindrical scanner" May 2013 (Year: 2013).*

*Primary Examiner* — Sam Refai
*Assistant Examiner* — Rashida R Shorter (57) ABSTRACT

A system may determine a field of view of a structure; identify a set of road segments that fall within the view area of the advertising unit; and identify mobile devices that have been physically located at locations associated with the road segments within the field of view (e.g., located within vehicles that have traversed the road segments). The system may further receive a request for a report that indicates a quantity or other information (e.g., demographics information) regarding the identified mobile devices over a period of time.

20 Claims, 4 Drawing Sheets

(56) References Cited

U.S. PATENT DOCUMENTS

2012/0271684 A1* 10/2012 Shutter .................. G06Q 30/02
                                                            705/14.1
2013/0318182 A1* 11/2013 Palnati ................... H04L 51/20
                                                            709/206
2014/0188616 A1*  7/2014 Badenhop .......... G06Q 30/0267
                                                            705/14.58

* cited by examiner

SYSTEMS AND METHODS FOR USING MOBILE DEVICE LOCATION INFORMATION TO DETERMINE PROXIMITY AND LINE OF SIGHT TO STRUCTURES

BACKGROUND

Advertisements may be placed in public locations so that they may be viewed by those who pass by the advertisements. For example, advertisers may buy advertisement space on billboards or bus stop street furniture to build brand awareness. However, it may be difficult for advertisers to determine how large of an audience is actually able to view a particular advertisement over a period of time. Moreover, it may be difficult for the advertisers to gain information regarding the demographic or other attributes of the audience who may be able to view the advertisement.

DETAILED DESCRIPTION

An advertising system may maintain information regarding structures on which advertisements may be placed. These structures may be referred to as ad units. The ad units may be placed within view of various road segments, such that people who pass by the units may see content displayed on the ad units. The advertising system may be further configured to generate reports that provide information regarding the audience of people who may view the ad units. To do so, the advertising system may be configured to determine which road segments are within view of what ad units, determine which mobile subscribers traversed the determined road segments, and compile a report including number and demographic attributes of the ad unit audience based on the traversing mobile subscribers.

The advertising system may utilize a segment identifier module of an ad unit reporting device to determine from what road segments an ad unit may be viewable. For example, based on ad unit attributes such as latitude, longitude, ad unit orientation, advertisement width and height, the segment identifier module may be configured to determine a field of view, sight distance, and ad unit orientation information. Using the field of view, sight distance, and orientation, the segment identifier module may compute a view area expanding out from the advertising unit. The segment identifier module may identify a set of road segments that are included within the view area, and may further filter the set of road segments to avoid double-counting and to ensure ad unit visibility from the road segments.

The advertising system may further utilize a data warehouse to aggregate data regarding mobile subscribers who traverse road segments. For example, a network service provider may collect data when mobile subscriber devices send or receive calls, send or receive text messages, or browse or use mobile applications on their mobile devices (e.g., what sites were visited, what applications were used, lengths of time spend performing the usage). The network service provider may further collect information indicative of where the mobile subscriber devices were located during the network usage, thereby generating location information indicative of which subscribers traversed what road segments at what times. Moreover, the data warehouse may be further configured to analyze the collected web and application usage data to determine preferences or other characteristics of the subscribers based on what websites or other content the subscribers were accessing on their subscriber devices. By combining the application usage data locations with the network usage data and web and other supplemental information such as subscriber demographics, the data warehouse may accordingly generate aggregate subscriber data including demographic information and other preferences of the audience of subscribers who traverse the road segments.

Based on the aggregate subscriber data and the road segments associated with the ad units, an ad unit subscriber report module of the ad unit reporting device may be configured to respond to requests for reports regarding the demographics, favorite websites, or other aspects of the audience who passes by an ad unit over various points of time (e.g., per day, on a particular day, on weekends, on Monday nights, etc.). The ad unit reporting device may accordingly identify the set of road segments associated with the ad unit, query for subscriber information for those subscribers associated with the road segment locations over the designated period of time, and provide a report including counts, demographics, other information regarding the ad unit audience. To ensure privacy of the subscribers whose information is included in reports, the system may remove sub scriber identifiable information (e.g., names and phone numbers) from the sub scriber information.

Figure 1:
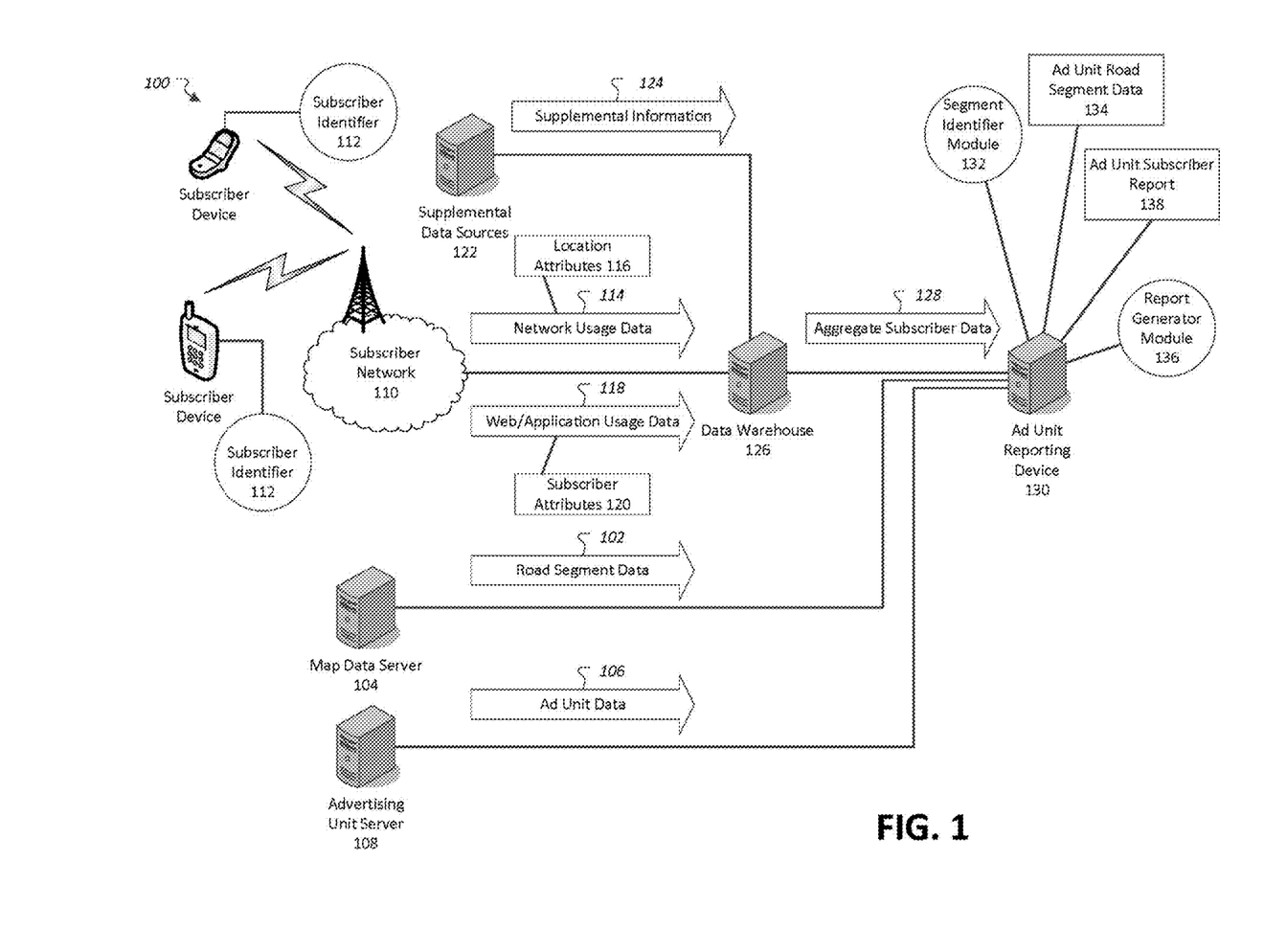
FIG. 1 illustrates an exemplary system for providing reports for ad units based on collected data from subscriber network devices.

FIG. 1 illustrates an exemplary system 100 for providing ad unit subscriber reports 138 for ad units based on collected data from subscriber network 110 devices. The system may include a map data server 104 configured to provide road segment data 102 and an ad unit server 108 configured to provide ad unit data 106. The system 100 may further include a subscriber network 110 configured to provide communications services to a plurality of subscriber devices, and to generate network usage data 114 and web and application usage data 118 based on the provided services. The data warehouse 126 may be configured to assign location attributes 116 to the network usage data 114, assign subscriber attributes 120 to the received web and application usage data 118, receive demographic information 124 from supplemental data sources 122 and process the received data into aggregate subscriber data 128 matched by subscriber identifiers 112. The system 100 may also include an ad unit reporting device 130 configured to utilize a segment identifier module 132 to receive road segment data 102 and ad unit data 106, and generate ad unit segment data 134 indicative of which ad units are viewable from what road segments. The ad unit reporting device 130 may also include a report generator module 136 configured to receive requests for ad unit reports 138, and to generate the ad unit reports 138 based on the aggregate subscriber data 128 and the ad unit segment data 134. The system 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

Road segment data 102 may be defined as data indicative of a portion of roadway or other path over which a vehicles or pedestrians may be capable of traversing. Road segment data 102 may include data indicative of one or more of: roadways that may be traversed by automobiles or trucks, sidewalks, bike paths, trolley lines, and light rail lines, as some examples. Exemplary sets of road segment data 102 may include, for example, the open street map (OSM) data set maintained by the OpenStreetMap Foundation, and the Navteq® map data distributed by the Location & Commerce division of Nokia Corporation. The map data server 104 may be configured to maintain geographic road segment data 102 regarding the roads and other pathways that may be traversed. Exemplary elements of geographic road segment data 102 may include: a unique identifier of the road segment, starting and ending latitude and longitude values for the identified road segment, a road segment direction (e.g., North, South, East, West, South by Southwest), a way name (e.g., a name of the road in which the road segment is included), a way identifier (e.g., a unique map data identifier corresponding to the indicated way name), a highway type (e.g., whether the indicated road segment is a residential road, a primary road or secondary road), a speed limit of the road segment (e.g., in miles per hour), and a segment length of the indicated road segment (e.g., in meters), as some examples. As the road segments may be directional, a two-way segment of roadway may include two separate segments and segment identifiers, one for each direction.

An ad unit may include a structure on which advertisements may be placed. The ad units may be placed within view of various portions of roadway or other paths, with the intent that people who pass by the ad units may see the content displayed on the ad units. Exemplary ad units may include billboards and street furniture, such as advertisements on bus stops or benches. The ad unit server 108 may be configured to maintain ad unit data 106 regarding the ad units available to the system 100. As some non-limiting examples, the ad unit data 106 may include: an ad unit identifier (e.g., an internal system-defined unique identifier identifying the ad unit), an ad unit code (e.g., an advertiser or other externally-provided code identifying the ad unit), an ad unit direction (e.g., a direction in which the ad unit is facing, sometimes encoded as a direction abbreviation such as North, South, East, West, South by Southwest), an ad unit name (e.g., a friendly name to include in a user interface apart from ad unit number), size information about advertisements carried by the ad unit such as width and height, height of the ad unit over ground level, type of ad unit (e.g., billboard, street furniture) and information indicative of the content or advertiser whose content is included on the ad unit.

The subscriber network 110 may provide communications services, such as packet-switched network services (e.g., Internet access, VoIP communication services) and location services (e.g., device positioning), to devices connected to the subscriber network 110. Exemplary subscriber networks 110 may include a VoIP network, a VoLTE (Voice over LTE) network, a cellular telephone network, a fiber optic network, and a cable television network, as some non-limiting examples.

Subscriber devices on the subscriber network 110 may be associated with subscriber identifiers 112 used to unique identify the corresponding devices. Subscriber identifiers 112 may include various types of information sufficient to identify the identity of a subscriber or a subscriber device over the subscriber network 110, such as mobile device numbers (MDNs), mobile identification numbers (MINs), telephone numbers, common language location identifier (CLLI) codes, Internet protocol (IP) addresses, and universal resource identifiers (URIs), as some non-limiting examples.

The subscriber network 110 may generate data records representing usage of the subscriber network 110 by the subscriber devices, for purposes including billing and network traffic management. Exemplary network usage of the subscriber network 110 may include placing or receiving a telephone call, sending or receiving a text message, using the web browser to access Internet web pages, and interacting with a networked application in communication with a remote data store. A usage data record of a subscriber making use of the subscriber network 110 may be referred to herein as a transaction or transaction record. Usage records of transactions may include information indexed according to the subscriber identifier 112 of the device using the subscriber network 110. For example, data records of phone calls and SMS messages sent or received by a subscriber device may include the MDN of the originating device and of the destination devices.

The subscriber network 110 may be configured to capture network usage data 114 from various network elements. Network usage data 114 may include data captured when a subscriber is involved in a voice call over the subscriber network 110, sends or receives a text message over the subscriber network 110, or otherwise makes use of a data or voice service of the network to communicate with other subscriber devices accessible via the subscriber network 110. The network elements of the subscriber network 110 may include a collection of network switches or other devices throughout the subscriber network 110 configured to track and record these subscriber transactions, e.g., regarding usage of the subscriber network 110 services by subscriber communications devices for billing purposes. This data collected by the network switches or other devices may include, for example, bandwidth usage, usage duration, usage begin time, usage end time, line usage directionality, endpoint name and location, and quality of service, as some examples. The network usage data 114 may use the collected data to identify and include information regarding when the communications took place, as well as identifiers of the network switches or other devices throughout the subscriber network 110 from which location information may be determined. It should be noted that approximate times may be sufficient for inclusion in the network usage data 114 (e.g., rounded to the nearest second or five seconds), rather than the full precision of time information that may be captured by the subscriber network 110. Accordingly, the network usage data 114 may include records of subscriber actions typically recorded by the subscriber network 110 in the ordinary course of business.

The subscriber network 110 may further include a location identification module configured to receive network usage data 114 from the various network switches of the subscriber network 110, and determine the location fixes for collected items of network usage data 114, such as for calls or text messages. To do so, the location identification module may locate the network device; associate the device with a location (e.g., a venue, point of interest, or roadway segment); and extrapolate the total population and demographic composition of the subscribers of the network devices to correspond to the population at large.

One exemplary method for determining location information to include in network usage data 114 may be to use advanced forward link trilateration (AFLT), whereby a time difference of arrival technique is employed based on responses to signals received from multiple nearby base stations. The distances from the base stations may be estimated from round trip delay in the responses, thereby narrowing down the location information without requiring subscriber devices to be capable of global positioning systems (GPS) or other types of location identification. If available, GPS may additionally or alternately be used to provide location fixes for network usage data 114. Another method for determining location information to include in network usage data 114 is by way of identification of a communication being served by an antenna system configured to operate in a confined and specific area, such as a section of a stadium or other venue. For example, identifying that a subscriber device is being served by one of the antenna systems may allow for determination of location data regarding the subscriber position within the venue with relatively high accuracy and precision.

The location fixes may include data such as latitude/longitude, a timestamp, a precision value (e.g., radius in meters), and an identifier of the associated subscriber device. The precision value of the location fixes may vary according to the precision of the mechanism used to determine the location of the subscriber device. For example, a GPS-derived location may include a precision value of approximately 5-30 meters, an AFLT-derived location may include a precision value of approximately 30-200 meters, and a time difference of arrival-derived location may include a precision value of approximately 100-200 meters, as some examples.

The location identification module configured may identify and associate the location fixes with the captured network usage data 114 to indicate locations of the subscriber devices when the records of network usage data 114 were captured. For example, the location identification module may be configured to associate the received network usage data 114 with corresponding location attributes 116 of roadway segment data 102, geo-fence information related to the location of the underlying call or subscriber network 110 use, or associations of the transaction record with a point of interest, such as a store or other landmark at or nearby the indicated location.

The location identification module may be configured assign the network usage data 114 with roadway segment data 102 by computing a point-to-line distance between the determined location fixes and the roadway segment data 102. The location identification module may also be configured to perform path analysis to find intermediate roadway segments of roadway segment data 102, such as by handling the road segment data 102 as a graph and extrapolating an optimal path (e.g., in terms of distance, time, etc.) between the identified roadway segment data 102 based on the time, location, and precision information of the available location fixes.

The subscriber network 110 may also be configured to capture web and application usage data 118 from various network elements. These network elements may include a collection of regional distribution centers or other devices throughout the subscriber network 110 containing equipment used to complete wireless mobile data requests to data services, such as websites or data repositories feeding data to device applications. The distribution centers may be configured to track subscriber transactions and record web and application usage data 118 regarding Internet usage of subscriber network 110 services by subscriber communications devices, e.g., as part of tracking subscriber usage to facilitate billing. In some cases, the distribution centers may be configured to perform more detailed data gathering than required for billing purposes, such as deep packet inspection to obtain details of hypertext transfer protocol (HTTP) header information or other information being requested or provided to the subscriber devices of the subscriber network 110. Thus, the distribution centers may be configured to capture web and application usage data 118 related to mobile internet usage by network service provider subscribers including data such as: end time of receiving information from a uniform resource locator (URL) address, duration of time spent at the URL, a (hashed or otherwise encrypted) identifier of the subscriber MDN, an indication of the HTTP method used (e.g., GET, POST), the URL being accessed, user agent strings (e.g., including device operating system, browser type and browser version), an indication of content type (e.g., text/html), a response code resulting from the HTTP method, a number bytes sent or received, an indication of a type of sub-network over which the usage was made (e.g., 3G, 4G), indications of usage of mobile applications, lengths of time spend performing browsing and application use, number of application downloads, and network topology location where the URL was accessed or the application was used or downloaded.

The subscriber network 110 may further include analytics functionality configured to assign categories to the URLs and applications used (e.g., "news", "sports", "real estate", "social", "travel", "business", "automotive", etc.). For example, a visit to the CNN website may be assigned to a "news" category, while a visit to the ESPN website may be assigned to a "sports" category. The analytics functionality may be further configured to assign subscriber attributes 120 to the web and application usage data 118 records based on the category analysis. A subscriber attribute 120 may be indicative of a preference of the subscriber for content in a particular category of content. A subscriber may be associated with zero or more subscriber attributes 120. For example, the analytics functionality may analyze the processed web and application usage data 118 for a subscriber (e.g., keyed to a subscriber identifier 112) over a period of time (e.g., per day) to derive subscriber attributes 120 for that subscriber's records over the time period. For instance, a subscriber who has browsed several websites within the "sports" category during the day might be associated with a "sports enthusiast" subscriber attribute 120. As another example, a subscriber who frequents travel websites may be associated with a "business travel" subscriber attribute 120. As yet a further example, a subscriber who frequents discount websites may be associated with a "discount shopper" subscriber attribute 120. The analytics functionality may utilize various heuristics to determine how much subscriber activity may be required to associate a subscriber with a category. For example, the analytics functionality may utilize a minimum threshold number of visits to websites in a category to associate the subscriber with that category, or a minimum threshold percent of visits to websites in the category to associate the subscriber with that category. In some cases, the analytics functionality may require subscriber activity for a category in a plurality of periods of time in order to associate a subscriber with a category. Moreover, the analytics functionality may update subscriber attributes 120 associated with the subscribers based on data received for later periods of time.

The system 100 may further include various additional supplemental data sources 122 configured to provide supplemental information 124 to the system 100 apart from subscriber usage of the subscriber network 110. As one example, a supplemental data source 122 may be configured to provide supplemental information 124 indicative of demographics regarding residents (e.g., census information, third-party compiled information from a vendor such as Experian™ or Acxion™), in many cases broken down geographically (e.g., by state, zip code, Nielson designated market areas, etc.). As other examples, the supplemental data sources 122 may be configured to provide supplemental information 124 regarding subscribers based on their attributes (e.g., age, gender, race, income, primary language), as well as supplemental information 124 including road segment traffic count information for use in analysis of drivers or other travelers. As yet a further example, a supplemental data source 122 may include billing information regarding customer accounts of the subscriber network 110 that may include address, age, gender, or other accountholder information relevant to the system 100.

The data warehouse 126 may be configured to receive and maintain network usage data 114 and web and application usage data 118 from the subscriber network 110 as well as supplemental information 124 from the supplemental data sources 122. Before transmission to the data warehouse 126, the subscriber network 110 may be configured to utilize a hashing module to convert subscriber identifiers 104 included in the network usage data 114 and web and application usage data 118 (e.g., customer mobile numbers, origination MIN, dialed digits) into hashed identifiers using a pre-defined two-way encryption methodology. The data warehouse 126 may be configured to decrypt the data using the methodology, to allow for secure transmission of the network subscriber data from the subscriber network 110 to the data warehouse 126.

The data warehouse 126 may be further configured to correlate the received data by subscriber identifier 112 (e.g., MDNs of the subscriber devices, subscriber names, etc.), thereby providing combined information for the subscribers including subscriber location attributes 116 as well as related to subscriber attributes 120 and demographics. This correlated data may be referred to as aggregate subscriber data 128. The data warehouse 126 may be further configured to ensure subscriber anonymity in the aggregate subscriber data 128, for example, by removing subscriber identifiers 112 from the aggregate subscriber data 128.

The ad unit reporting device 130 may be configured to utilize a segment identifier module 132 to receive the road segment data 102, receive the ad unit data 106, and determine from which road segments the ad units are viewable. The associated road segments for the ad unit may be referred to as ad unit segment data 134, and may be maintained by the ad unit reporting device 130 (or a device accessible to the ad unit reporting device 130) for further use. For example, based on ad unit data 106 such as latitude, longitude, orientation, width, height, and ad unit type, the segment identifier module 132 may be configured to determine a field of view, sight distance, and ad unit orientation information. Using the determined field of view, sight distance, and ad unit orientation, the segment identifier module 132 may generate a view area emanating from the ad unit. The segment identifier module 132 may accordingly identify the set of road segments to include in the ad unit segment data 134 for the ad unit as those that are included within the view area. The segment identifier module 132 may be configured to filter the ad unit segment data 134 to avoid double-counting and to ensure ad unit visibility from the identified road segments of the road segment data 102.

The ad unit segment data 134 may include at least a subset of the elements of ad unit data 106 of the ad unit for which the road segments are associated. The ad unit segment data 134 may also include information about the road segments associated with the ad unit, such as: a target street name (e.g., a name of the closest or a closest large street for which subscriber data is targeted to be included), a target street name identifier (e.g., an identifier of the indicated target street name), a unique identifier of the road segment of the target street, starting and ending latitude and longitude values for the identified road segment (e.g., useful to find the intersections and the road segments entering and leaving the intersection), a road segment direction (e.g., information specifying the direction of the road segment, useful in comparing road segment direction to ad unit direction), a way name (e.g., a name of the road in which the road segment is included, not of the road segment, useful to cull multiple identified sub-segments of a single road), a way identifier (e.g., a unique map data identifier corresponding to the indicated way name), a highway type (e.g., whether the indicated road segment is a residential road, a primary road or secondary road), a speed limit of the road segment (e.g., in miles per hour), a segment length of the indicated road segment (e.g., in meters), a distance from the indicated ad unit to the indicated road segment (e.g., the distance in meters between the ad unit and a closest point of the identified road segment, useful to eliminate road segments beyond a distance from the ad unit), an angle from the ad unit (e.g., from a midpoint of the ad unit, useful to determine whether the ad unit is viewable from the road segment), an indication of whether the traffic flow over the segment originates inside or outside the area in which aggregate subscriber data 128 may be retrieved, an indication of whether the traffic flow over the segment terminates inside or outside the view area, an intersection identifier (e.g., an identifier of the intersections ordered in terms of increasing distance from the ad unit, useful to choose a name to associate with the ad unit), a road segment type (e.g., identifying whether the road segment is entering or exiting the indicated intersection).

Each entry of the ad unit segment data 134 may also include information about whether the road segments should be including in audience determinations for the ad unit, such as: an include indication (e.g., a binary yes/no encoding, 'KEEP' signifying that the identified road segment should be utilized in determining audience information for the ad unit and 'DROP' otherwise, etc.) and an include reason including a description or identifier of a reason why the indicated road segment is or is not included. For included road segments, an exemplary reason for inclusion may be that the entry is a "First road segment of the same way name driving into intersection." For excluded road segments, an exemplary exclude reason may be one of: "Dropped to avoid double counting. Road segment with the same way name already accounted for", "First road segment of the same way name driving away from intersection", "Ad unit facing direction and road segment direction same" and "Distance to the ad unit greater than sight distance."

The ad unit reporting device 130 may be further configured to utilize a report generator module 136 to receive the aggregate subscriber data 128, receive a request for an ad unit report 138 regarding the audience of an ad unit, and retrieve the ad unit segment data 134 associated with the ad unit. The report generator module 136 may be further configured to query the aggregate subscriber data 128 for subscriber information according to the ad unit segment data 134, and to provide the ad unit report 138 responsive to the request based on the resultant subscriber information. The generated ad unit report 138 may accordingly include audience counts and information, such as counts of audience members within various demographic categories or having certain identified interests. An advertiser may receive the ad unit report 138, and may use the information to determine whether to place an ad on the ad unit or to analyze the reach of an advertisement placed on the ad unit.

Figure 2A:
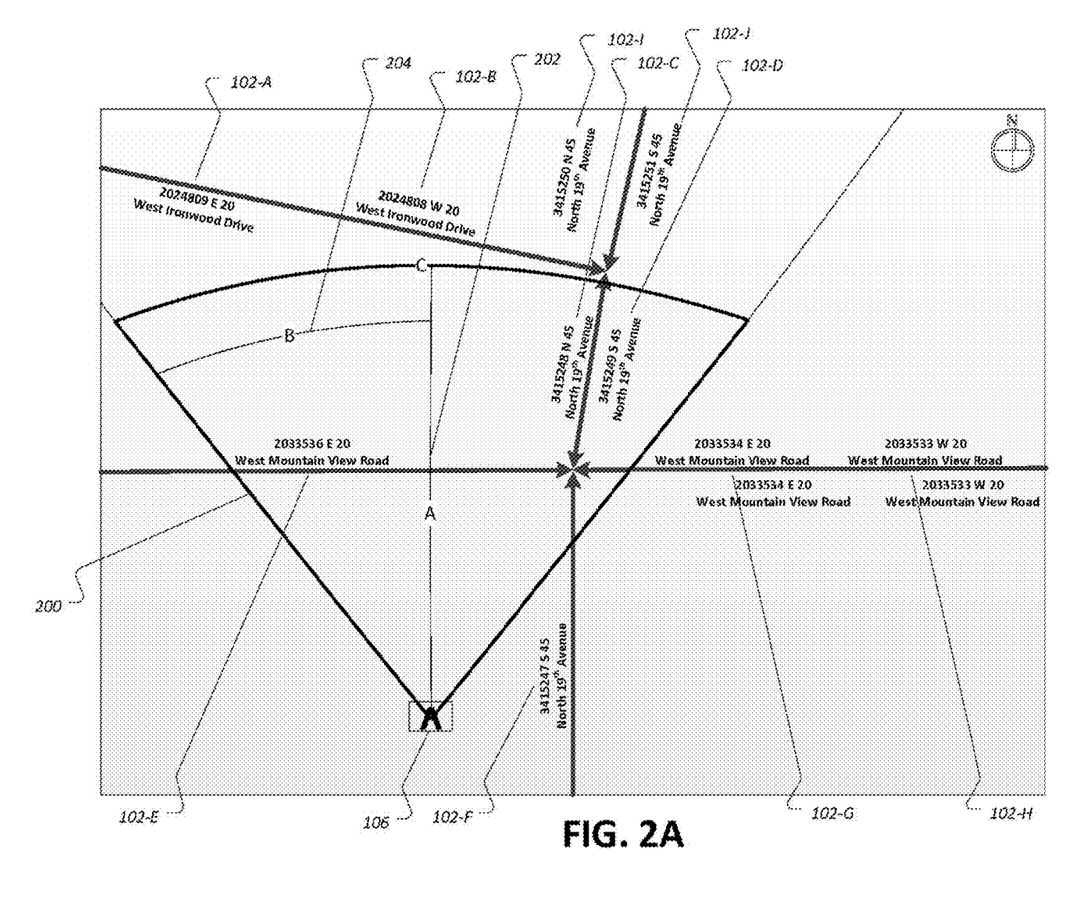
FIG. 2A illustrates an exemplary view area for an ad unit.

FIG. 2A illustrates an exemplary view area 200 for an ad unit. The view area 200 may be computed by the segment identifier module 132 as an overlay over plotted road segment data 102. The segment identifier module 132 may capture which road segments fall within the view area 200, and may thereby determine the road segments from which the ad unit is visible. While the view area 200 and road segments are illustrated graphically in FIG. 2A for sake of illustration, it should be noted that the computation of the view area 200 and included road segments may be computed algorithmically (e.g., using trigonometric mathematics library code), without requiring visualization.

The segment identifier module 132 may determine a sight distance 202 (illustrated as distance A) and a field of view angle 204 (illustrated as angle B) in order to generate the view area 200. As one example, the segment identifier module 132 may use a default sight distance 202 and a default field of view angles 204 to generate the view area 200. For instance, the segment identifier module 132 may use a default sight distance 202 of one hundred and seventy five (175) meters, and a default field of view angle 204 of thirty (30) degrees each side of the head-on sight distance, forming an arc of sixty (60) degrees.

As another example, the segment identifier module 132 may determine the sight distance 202 and field of view angle 204 based on attributes of the ad unit data 106, such as width of the advertising unit, height of the advertising unit, type of structure on which the advertising unit is placed (e.g., billboard, street furniture such as a bus stop shelter or a bench, etc.), and technology of the ad unit (e.g., LED display, OLED display, paper image, etc.). For instance, ad units located at a greater height (e.g., taller billboards) may be assigned a greater sight distance 202 and/or field of view angle 204 than ad units located at a lesser height (e.g., a bus stop shelter). As another possibility, taller or wider ad units may be assigned relatively greater sight distances 202 and/or field of view angles 204 than shorter or narrower ad units. As yet a further possibility, ad units in more hilly, urban, or cluttered terrain may be assigned lesser sight distances 202 and/or narrower field of view angle 204.

Figure 2B:
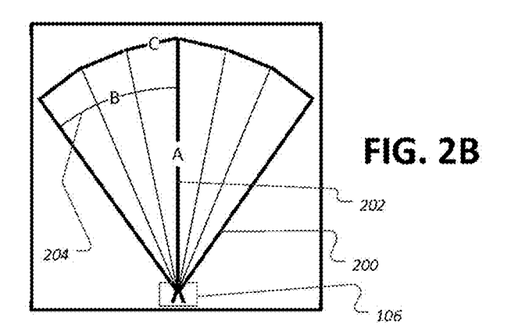
FIG. 2B illustrates an alternate exemplary view area for an ad unit.

Based on the determined sight distance 202 and field of view angle 204, the segment identifier module 132 may be configured to generate the view area 200. The view area 200 may be generated, in the direction that the ad unit faces, as an area bounded by an arc formed by a horizon that is the sight distance 202 away from a horizontal midpoint of the advertisement face of the ad unit, centered around the view direction of the ad unit (illustrated as due North). As shown in FIG. 2A, the view area 200 includes a smooth horizon arc (illustrated as horizon line C). In other examples, such as illustrated in FIG. 2B, to improve the speed of calculation the view area 200, horizon line C may be approximated as a triangle fan including a set of connected triangles, each covered a subset of the degrees of the field of view angle 204 (e.g., each covering three degrees of the field of view of the horizon line C). Thus, each triangle in the triangle fan may share a vertex at the horizontal midpoint of the advertisement face of the ad unit and a side with adjacent triangles, where the triangle fan forms the approximated radius of the view area 200 extending horizontally outward over the road segment data 102.

The segment identifier module 132 may capture which road segments are at least a portion within the view area 200 and may designate that the ad unit is visible from those included road segments. The determination of which road segments are included in the view area 200 may be performed using various packages of geographic information system (GIS) software, such as the ArcGIS software package distributed by Esri of Redlands, Calif. In some cases, the segment identifier module 132 may apply a minimum threshold amount of roadway distance (e.g., ten meters) that is required to be within the view area 200 before including the road segment, while in other cases the minimum threshold may be any distance (e.g., greater than zero meters). As illustrated, the segment identifier module 132 may determine that the ad unit is visible from the road segments indicated by road segment data 102-A through 102-H, but not from the road segments indicated by road segment data 102-I and 102-J.

The segment identifier module 132 may be further configured to filter the road segment data 102 to remove from consideration road segments that should not be tracked. For example, road segment data 102 may be removed from consideration to avoid over-counting of subscribers who are traveling in a direction in which an ad unit may not be visible, or to avoid double-counting of the same subscribers traveling multiple road segments. For example, the segment identifier module 132 may remove road segment data 102 for any road segments that are associated with a direction of travel away from the view direction of the ad unit (e.g., where direction of travel is calculated based on angle between start point and end point of the road segment). As another example, the segment identifier module 132 may remove road segment data 102 for any road segments that are headed out of an intersection when the set of road segment data 102 already indicates all road segments headed into the intersection. As yet a further example, the segment identifier module 132 may remove road segment data 102 for any road segments associated with a name of another segment in the set of road segments, which may occur if a road segment splits into multiple sub-segments due to length or geography, not because it is a different path for individuals to traverse.

As an even further example, if the type of an ad unit is identified as being street furniture, then the segment identifier module 132 may include road segment data 102 indicative of only the closest road segment to the ad unit. Or, the segment identifier module 132 may apply different sight distances 202 to road segment data 102 based on characteristics of the road segment data 102. For instance, road segment data 102 indicative of road segments with high speed limits (or high average speeds determined from road condition data, such as from real-time traffic speed data provided by various municipalities or services) may be further filtered using a shorter sight distance 202 to account for their reduced ability to be viewed by drivers.

Many road segments adjacent to ad units are relatively straight, such as highway roadways. Thus, approximating direction of travel calculations based on angle between start point and end point of the road segment may yield good results. However, some road segments may include substantial bends or curves, such as cloverleaf on-ramps or roads having ninety or more degree turns. Road segment data 102 associated with these segments may include intermediate vertices between a beginning point vertex and an end point vertex of the road segment. This road segment data 102 may require additional analysis to determine whether the ad unit is actually visible from the road segment, let alone visible for sufficient amount of time to be read by a traveler.

To accomplish the visibility determination for such road segments including multiple intermediate vertices, the segment identifier module 132 may be configured to iterate through the vertices of the road segment, and, for each portion (e.g., from vertex 0 to vertex 1, from vertex 1 to vertex 2, etc.) the segment identifier module 132 may determine a direction of travel, a length, and a travel time based on speed limit of the portion and length. Based on the determined data, the segment identifier module 132 may accumulate the amount of time spent traveling in various directions (e.g., North, East, South, West, South by Southwest, etc.), and may use that information to determine, based on the locations of the ad units, which ad units may be visible to travelers of the road segment. For example, if an ad unit is only visible to a traveler of a road segment for less than a predetermined amount of time (e.g., half a second, one second, three seconds, etc.), then that road segment may be filtered out of inclusion for use in determining audiences for that ad unit.

In some cases, rather than excluding a road segment due to limited time of visibility of an ad unit, the segment identifier module 132 may be configured to provide a scaling factor for potential ad unit impressions based on an amount of time that the ad unit is visible to travelers of a particular road segment. The amount of time that the ad unit is visible may be computed based on the length of the road segment and the speed limit or average speed of the road segment. For example, the segment identifier module 132 may be configured to determine a scaling factor of 0.5 for road segments from which the ad unit is visible for less than a second, a scaling factor of 0.75 for road segments road from which the ad unit is visible for a second or more but less than two seconds, and a scaling factor of 1 for road segments visible for at least two seconds. As other possibilities, the scaling factor may be determined based on road segment length independent of speed limit or average speed, or speed limit or average speed independent of road segment length.

Figure 3:
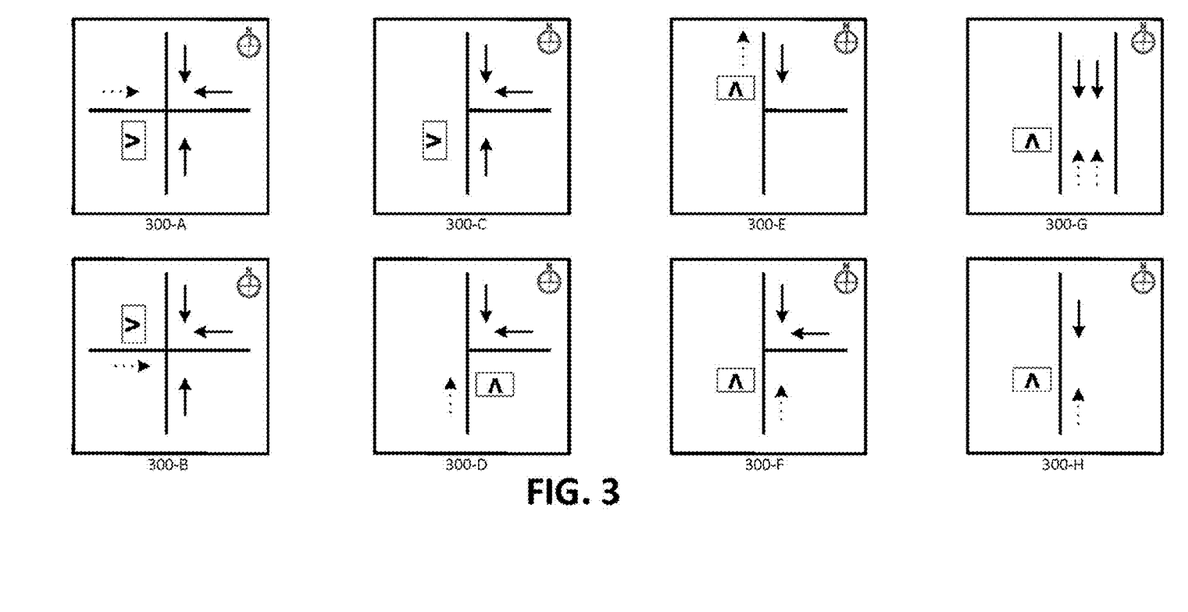
FIG. 3 illustrates exemplary filtering of sets of road segment data identified as within view areas of exemplary ad units.

FIG. 3 illustrates exemplary filtering of sets 300-A through 300-I (collectively 300) of road segment data 102 identified as within view areas 200 of exemplary ad units. For each of the exemplary sets 300, arrows indicated in dotted lined may be filtered out by the segment identifier module 132, while the arrows indicated by solid lines may remain included in the sets 300 of road segments. It should be noted that the exemplary sets 300 only illustrate traffic flows entering intersections, because to avoid double-counting the segment identifier module 132 may be configured to remove traffic flows exiting the intersections. Moreover, it should further be noted that various exemplary sets 300 are merely exemplary, and other situations including rotation, mirroring, and combination of the sets 300 are possible.

For the exemplary road segments of set 300-A, northbound, southbound, and westbound road segments may be included in the ad unit segment data 134 for an ad unit, but the eastbound road segment may be filtered out as being in the same direction as the ad unit. Similarly, for the set 300-B, the eastbound road segment may also be filtered out as being in the same direction as the ad unit, despite the ad unit being on the opposite corner of the intersection. For the set 300-C, as the ad unit is deemed visible from the northbound, southbound, and westbound flows, all three flows remain in the ad unit segment data 134. For the set 300-D, the northbound road segment may be filtered out as being in the same direction as the north-facing ad unit. For the set 300-E, northbound traffic may be filtered out as being in the same direction as the ad unit, and westbound traffic may be outside of the view area 200 for the ad unit and not subject to inclusion. For the set 300-F, similar to the set 300-D, the northbound road segment may be filtered out as being in the same direction as the north-facing ad unit, despite the ad unit being located on the opposite side of the roadway. For the exemplary set 300-G and 300-H, the northbound flows may be filtered out as being in the same direction as the north-facing ad units, with the southbound flows remaining.

Figure 4:
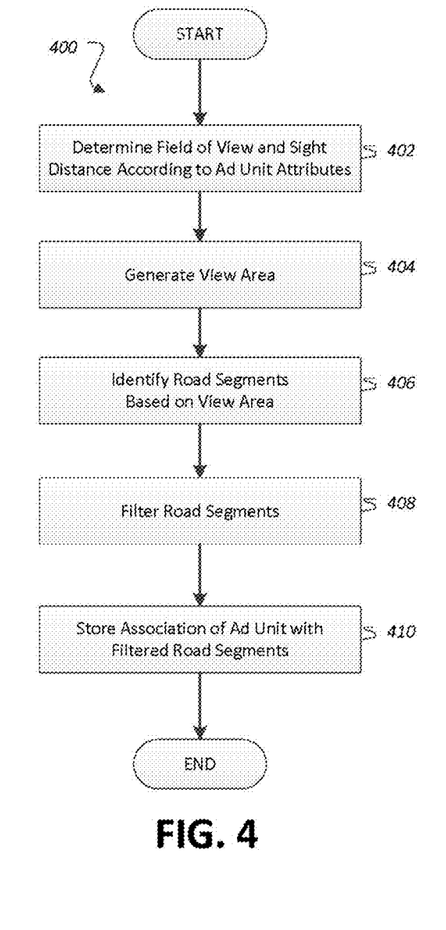
FIG. 4 illustrates an exemplary process for association of road segment data with ad units.

FIG. 4 illustrates an exemplary process 400 for association of road segment data 102 with ad unit data 106. The process 400 may be performed, for example, by the segment identifier module 132 of the ad unit reporting device 130.

At block 402, the segment identifier module 132 determines a sight distance 202 and a field of view angle 204 according to attributes of an ad unit data 106. As one example, the segment identifier module 132 may use a default sight distance 202 of one hundred and seventy five (175) meters, and a default field of view angle 204 of thirty (30) degrees each side of the head-on sight distance 202, forming an arc of sixty (60) degrees. As another example, the segment identifier module 132 may determine the sight distance 202 and field of view angle 204 based on attributes of the ad unit data 106, such as width of the advertising unit, height of the advertising unit, and type of structure on which the advertising unit is placed (e.g., billboard, street furniture such as a bus stop shelter or a bench, etc.)

At block 404, the segment identifier module 132 generates a view area 200 based on the determined sight distance 202 and field of view angle 204. For example, the segment identifier module 132 may generate the view area 200 in the direction that the ad unit data 106 faces, as an arc extending outward from a horizontal midpoint of the advertisement face of the ad unit. In some cases, the view area 200 may from a smooth arc, while in other cases the view area 200 may be approximated as a triangle fan including a set of connected triangles each covered a subset of the degrees of the field of view angle 204 (e.g., a triangle every three degrees).

At block 406, the segment identifier module 132 identifies road segment data 102 for road segments included within the generated view area 200. For example, the segment identifier module 132 may identify road segment data 102 indicative of road segments at least a portion within the view area 200, and may provisionally designate subject to filtering that the ad unit is visible from those included road segments. In some cases, the segment identifier module 132 may apply a minimum threshold amount of roadway distance (e.g., ten meters) of the road segment that is required to be within the view area 200 before including the road segment data 102, while in other cases the minimum threshold may be any distance greater than zero.

At block 408, the segment identifier module 132 filters the identified road segment data 102 to remove road segments that should not be tracked, e.g., to avoid over-counting of subscribers who are traveling in a direction in which the ad unit may not be visible, or to avoid double-counting of the same subscribers traveling multiple road segments. As some examples, the segment identifier module 132 may filter out road segments associated with a direction of travel away from the view direction associated with an ad unit, road segments headed out of an intersection when the set of road segments includes the road segments headed into the intersection, and road segment associated with a name of another segment in the set of road segments.

At block 410, the segment identifier module 132 stores an association of the filtered road segment data 102 with the ad unit. The associated road segments for the ad unit may be referred to as ad unit segment data 134, and may be maintained by the ad unit reporting device 130 or a device accessible to the ad unit reporting device 130 for later use. After the block 410, the process 400 ends.

Figure 5:
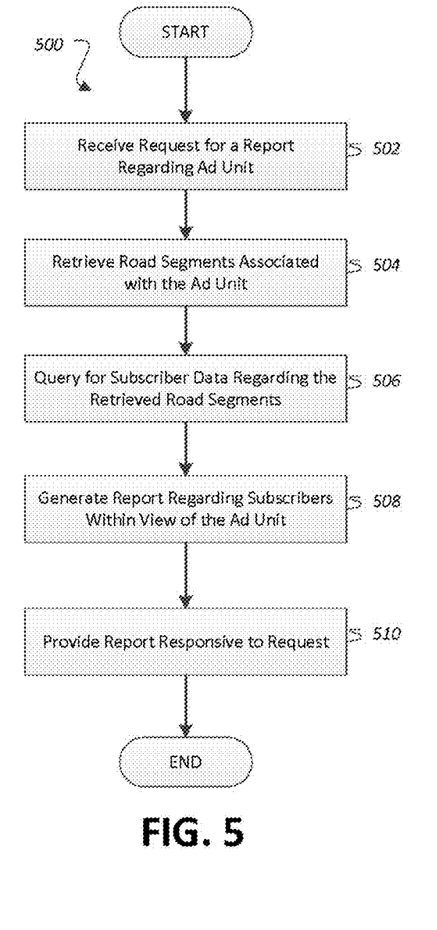
FIG. 5 illustrates an exemplary process for the creation of ad unit subscriber reports for ad units based on aggregate subscriber data.

FIG. 5 illustrates an exemplary process 500 for the creation of an ad unit report 138 for ad unit data 106 based on aggregate subscriber data 128. The process 500 may be performed, for example, by the report generator module 136 of the ad unit reporting device 130.

At block 502, the report generator module 136 receives a request for requested ad unit report 138 regarding an ad unit. For example, an advertiser or potential advertiser may desire an ad unit report 138 specifying details of the numbers and demographics of the audience who may view one or more ad units during a specified period of time.

At block 504, the report generator module 136 retrieves road segment data 102 for any road segments associated with the requested ad unit. For example, the report generator module 136 may retrieve ad unit segment data 134 associated with the ad unit. The ad unit segment data 134 may be generated according to the process 400 discussed in detail above.

At block 506, the report generator module 136 queries aggregate subscriber data 128 regarding the retrieved road segment data 102. For example, the report generator module 136 may query the data warehouse 126 for aggregate subscriber data 128 for subscribers whose time and location information matches that of the retrieved ad unit segment data 134 and time information specified by the request. The report generator module 136 may accordingly receive the requested aggregate subscriber data 128 from the data warehouse 126.

At block 508, the report generator module 136 generates the requested ad unit report 138. For example, the report generator module 136 may package the retrieved aggregate subscriber data 128 into a document or web interface to be provided to the requester of the ad unit report 138.

At block 510, the report generator module 136 provides the requested ad unit report 138. For example, the report generator module 136 may return the generated ad unit report 138 or a link to the generated ad unit report 138 to the requester of the ad unit report 138. After block 510, the process 500 ends.

Thus, the system 100 may be configured to generate ad unit reports 138 that provide information regarding the audience of people who may view requested ad units. To do so, the system 100 may be configured to determine which road segments are within view of what ad units, determine demographics and preferences of subscribers that traversed the determined road segments, and compile an ad unit report 138 including demographic or other attributes of the ad unit audience. The generated ad unit report 138 may accordingly include audience counts and information, such as counts of audience members within various demographic categories or having certain identified interests. An advertiser may receive the ad unit report 138, and may use the information to determine whether to place an ad on the ad unit or to analyze the reach of an advertisement placed on an ad unit.

Variations on the system 100 may be possible. As one possibility, generation of ad unit reports 138 may be enhanced to account for dynamic conditions by performing further filtering of the ad unit segment data 134 according to real-time data. For example, weather conditions may affect ad unit visibility. If it is snowing, raining, foggy, or there is a high level of smog, then the subscribers may experience a reduced visibility to a shorter sight distance 202. To account for this reduced visibility, before querying the aggregate subscriber data 128 regarding the retrieved road segment data 102, the report generator module 136 may be configured to retrieve the ad unit segment data 134 for the specified ad units, and further cull the ad unit segment data 134 to remove segments whose distance from the indicated ad unit to the indicated road segment (i.e., included in the ad unit segment data 134) is below a shortened sight distance 202 reflective of weather conditions during the specified time period of the query. Similarly, different sight distances 202 may be utilized for daytime travel as opposed to nighttime travel to account for those differences in ad unit visibility. As another possibility, ad units that are not lit at night may be excluded from reports covering nighttime hours.

In general, computing systems and/or devices, such as the data warehouse 126 and ad unit reporting device 130, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices, such as the such as the data warehouse 126 and ad unit reporting device 130, generally include computer-executable instructions such as the instructions of the segment identifier module 132 and report generator module 136, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

In one example, a computing device is configured to execute a software application on a processor of the computing device to provide operations comprising: generating a view area based on a field of view of an advertising unit, a sight distance from the advertising unit and a view direction associated with the advertising unit, the field of view indicative of an off-center horizontal angle beyond which the advertising unit is deemed out of sight, the sight distance indicative of a horizontal distance from the advertising unit in the field of view beyond which the advertising unit is deemed out of sight; identifying, from map data of an area surrounding the advertising unit, a set of road segments that fall within the view area of the advertising unit; and associating the advertising unit as being viewable to mobile subscribers of a network service provider traversing the identified set of road segments, the association being stored in memory for retrieval in response to requests for data regarding the advertising unit.

In a second example, the computing device is further configured to execute the software application to provide operations comprising: receiving a request for a report providing information regarding an audience available to the advertising unit over a period of time; querying a data warehouse for aggregate subscriber data associated with locations of the set of road segments over the period of time, the aggregate subscriber data compiled from the network usage of the mobile subscribers of the network service provider; and generating the report regarding the audience for the ad unit over the period of time based on the retrieved aggregate subscriber data.

In a third example, the computing device is further configured to execute the software application to provide operations comprising removing at least one road segment from the set of road segments by at least one of: (i) removing a road segment from the set of road segments that is associated with a direction of travel away from the view direction associated with an advertising unit; (ii) removing a road segment from the set of road segments that is headed out of an intersection when the set of road segments includes road segments headed into the intersection; and (iii) removing a segment from the set of road segments associated with a name of another segment in the set of road segments and headed in the same direction as the other segment.

In a fourth example, the computing device is further configured to execute the software application to provide operations comprising identifying the set of road segments that fall within the view area of the advertising unit by selecting road segments of the map data for which at least a predefined minimum distance of road segment roadway is within the view area.

In a fifth example, the computing device is further configured to execute the software application to provide operations comprising determining at least one of the field of view and the sight distance based on attributes of the advertising unit, the attributes including at least one of: width of the advertising unit, height of the advertising unit, and type of the advertising unit.

In a sixth example, the computing device of claim 1 is further configured to execute the software application to provide operations comprising generating the view area as a triangle fan including set of connected triangles that each share one central vertex emanating from a horizontal midpoint of the advertising unit in the view direction.

In a seventh example, the computing device is further configured to execute the software application to provide operations comprising providing information regarding each of the road segments including at least two of: road segment name, road segment length, road segment length within the view area of the advertising unit, whether the road segment begins within the view area, whether the road segment ends within the view area, and a speed limit of traffic over the road segment.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A device, comprising:
a memory device storing processor-executable instructions; and
one or more processors configured to execute the processor-executable instructions, wherein executing the processor-executable instructions causes the one or more processors to:
determine a field of view associated with a structure, the field of view including an arc having the structure as a center point;
identify a plurality of road segments within the field of view;
identify an intersection of a first road and a second road within the field of view associated with the structure;
identify a first road segment, of the plurality of road segments, that is a segment of the first road and is associated with a first direction of traffic that enters the intersection via the first road and travels towards the structure;
identify a second road segment, of the plurality of road segments, that is another segment of the first road and is associated with a second direction of traffic that exits the intersection via the first road and travels away from the structure;
identify a third road segment, of the plurality of road segments, that is a segment of the second road and is associated with a third direction of traffic that enters the intersection via the second road;
identify a fourth road segment, of the plurality of road segments, that is another segment of the second road and is associated with a fourth direction of traffic that exits the intersection via the second road;
determine location information associated with a plurality of mobile devices;
identify, based on the identification of the plurality of road segments and the location information of the plurality of mobile devices, a first set of mobile devices, of the plurality of mobile devices, that have been physically located at one or more locations that correspond to at least one of:
one or more locations that correspond to the first road segment, of the plurality of road segments within the field of view of the structure,
one or more locations that correspond to the third road segment, of the plurality of road segments within the field of view of the structure, or
one or more locations that correspond to the fourth road segment, of the plurality of road segments within the field of view of the structure,
wherein the first set of mobile devices is further identified respectively based on:
the first and third road segments being associated with directions of traffic that enter the intersection, or
the fourth road segment being associated with the fourth direction of traffic that exits the intersection;
filter a second set of mobile devices from the plurality of mobile devices by identifying, based on the identification of the plurality of road segments and the location information of the plurality of mobile device, a second set of mobile devices, of the plurality of mobile devices, that have been physically located at one or more locations that correspond to the second road segment and not the first road segment,
wherein the filtered second set of mobile devices is further identified based on the second road segment being associated with the third direction of traffic that exits the intersection; and
determine, based on the information that identifies the first set of mobile devices, and excludes the second set of mobile devices, that have been physically located at the one or more locations that correspond to the first road segment within the field of view of the structure, that the structure has been visible to the first set of mobile devices, and has not been visible to the filtered second set of mobile devices.

2. The device of claim 1, wherein executing the processor-executable instructions further causes the one or more processors to:
determine a height associated with the structure,
wherein a distance of the arc, from the center point, is determined based on the height associated with the structure.

3. The device of claim 1, wherein executing the processor-executable instructions further causes the one or more processors to:
determine a width associated with the structure,
wherein an angle of the arc is determined based on the width associated with the structure.

4. A non-transitory computer-readable medium, storing a set of processor-executable instructions, which, when executed by one or more processors, cause the one or more processors to:
determine a field of view associated with a structure, the field of view including an arc having the structure as a center point;
identify a plurality of road segments within the field of view;
identify an intersection of a first road and a second road within the field of view associated with the structure;
identify a first road segment, of the plurality of road segments, that is a segment of the first road and is associated with a first direction of traffic that enters the intersection via the first road and travels towards the structure;
identify a second road segment, of the plurality of road segments, that is another segment of the first road and is associated with a second direction of traffic that exits the intersection via the first road and travels away from the structure;

identify a third road segment, of the plurality of road segments, that is a segment of the second road and is associated with a third direction of traffic that enters the intersection via the second road;

identify a fourth road segment, of the plurality of road segments, that is another segment of the second road and is associated with a fourth direction of traffic that exits the intersection via the second road;

determine location information associated with a plurality of mobile devices;

identify, based on the identification of the plurality of road segments and the location information of the plurality of mobile devices, a first set of mobile devices, of the plurality of mobile devices, that have been physically located at one or more locations that correspond to at least one of:

one or more locations that correspond to the first road segment, of the plurality of road segments within the field of view of the structure,     one or more locations that correspond to the third road segment, of the plurality of road segments within the field of view of the structure, or     one or more locations that correspond to the fourth road segment, of the plurality of road segments within the field of view of the structure,     wherein the first set of mobile devices is further identified respectively based on:

the first and third road segments being associated with directions of traffic that enter the intersection, or         the fourth road segment being associated with the fourth direction of traffic that exits the intersection;

filter a second set of mobile devices from the plurality of mobile devices by identifying, based on the identification of the plurality of road segments and the location information of the plurality of mobile device, a second set of mobile devices, of the plurality of mobile devices, that have been physically located at one or more locations that correspond to the second road segment and not the first road segment,     wherein the filtered second set of mobile devices is further identified based on the second road segment being associated with the third direction of traffic that exits the intersection; and determine based on the information that identifies the first set of mobile devices, and excludes the second set of mobile devices, that have been physically located at the one or more locations that correspond to the first road segment within the field of view of the structure, that the structure has been visible to the first set of mobile devices, and has not been visible to the filtered second set of mobile devices.

5. The non-transitory computer-readable medium of claim 4, wherein the processor-executable instructions further include processor-executable instructions to:

determine a height associated with the structure, wherein a distance of the arc, from the center point, is determined based on the height associated with the structure.

6. The non-transitory computer-readable medium of claim 4, wherein the processor-executable instructions further include processor-executable instructions to:

determine a width associated with the structure, wherein an angle of the arc is determined based on the width associated with the structure.

7. A method, comprising:

determining, by a device, a field of view associated with a structure, the field of view including an arc having the structure as a center point;

identifying, by the device, a plurality of road segments within the field of view;

identifying, by the device, an intersection of a first road and a second road within the field of view associated with the structure;

identifying, by the device, a first road segment, of the plurality of road segments, that is a segment of the first road and is associated with a first direction of traffic that enters the intersection via the first road and travels towards the structure;

identifying, by the device, a second road segment, of the plurality of road segments, that is another segment of the first road and is associated with a second direction of traffic that exits the intersection via the first road and travels away from the structure;

identifying, by the device, a third road segment, of the plurality of road segments, that is a segment of the second road and is associated with a third direction of traffic that enters the intersection via the second road;

identifying, by the device, a fourth road segment, of the plurality of road segments, that is another segment of the second road and is associated with a fourth direction of traffic that exits the intersection via the second road;

determining, by the device, location information associated with a plurality of mobile devices;

identifying, by the device and based on the identification of the plurality of road segments and the location information of the plurality of mobile devices, a first set of mobile devices, of the plurality of mobile devices, that have been physically located at one or more locations that correspond to at least one of:

one or more locations that correspond to the first road segment, of the plurality of road segments within the field of view of the structure,     one or more locations that correspond to the third road segment, of the plurality of road segments within the field of view of the structure, or     one or more locations that correspond to the fourth road segment, of the plurality of road segments within the field of view of the structure,     wherein the first set of mobile devices is further identified respectively based on:

the first and third road segments being associated with directions of traffic that enter the intersection, or         the fourth road segment being associated with the fourth direction of traffic that exits the intersection;

filtering, by the device and based on the identification of the plurality of road segments and the location information of the plurality of mobile device, a second set of mobile devices from the plurality of mobile devices by identifying a second set of mobile devices, of the plurality of mobile devices, that have been physically located at one or more locations that correspond to the second road segment and not the first road segment; and determining, by the device, information that identifies the first set of mobile devices, and excludes the second set of mobile devices, that have been physically located at the one or more locations that correspond to the first road segment within the field of view of the structure, that the structure has been visible to the first set of mobile devices, and has not been visible to the filtered second set of mobile devices.

8. The method of claim 7, further comprising:
determining a height associated with the structure,
wherein a distance of the arc, from the center point, is determined based on the height associated with the structure.

9. The method of claim 7, further comprising:
determining a width associated with the structure,
wherein an angle of the arc is determined based on the width associated with the structure.

10. The method of claim 7, wherein the field of view includes at least a first triangle fan and a second triangle fan that each share the center point as a vertex, wherein the first triangle fan extends to a first distance from the center point that is farther than a second distance to which the second triangle fan extends from the center point.

11. The method of claim 7, further comprising:
determining that at least a threshold distance of the first road segment is within the field of view of the structure,
wherein the identification of the first road segment includes determining that at least the threshold distance of the first road segment is within the field of view of the structure.

12. The method of claim 11, further comprising:
identifying a third road segment that is within the field of view of the structure; and
determining that at least the threshold distance of the third road segment is not within the field of view of the structure,
wherein storing or outputting the information that identifies the first set of mobile devices further includes excluding, from the stored or outputted information, information that identifies a third set of mobile devices that have been physically located on the third road segment and have not been physically located on the first road segment.

13. The device of claim 1, wherein the field of view includes at least a first triangle fan and a second triangle fan that each share the center point as a vertex, wherein the first triangle fan extends to a first distance from the center point that is farther than a second distance to which the second triangle fan extends from the center point.

14. The device of claim 1, wherein executing the processor-executable instructions further causes the one or more processors to:
determine that at least a threshold distance of the first road segment is within the field of view of the structure,
wherein the identification of the first road segment includes determining that at least the threshold distance of the first road segment is within the field of view of the structure.

15. The device of claim 14, wherein executing the processor-executable instructions further causes the one or more processors to:
identify a third road segment that is within the field of view of the structure; and
determine that at least the threshold distance of the third road segment is not within the field of view of the structure,
wherein executing the processor-executable instructions, to store or output the information that identifies the first set of mobile devices, further causes the one or more processors to exclude, from the stored or outputted information, information that identifies a third set of mobile devices that have been physically located on the third road segment and have not been physically located on the first road segment.

16. The non-transitory computer-readable medium of claim 4, wherein executing the processor-executable instructions further causes the one or more processors to:
determine that at least a threshold distance of the first road segment is within the field of view of the structure,
wherein the identification of the first road segment includes determining that at least the threshold distance of the first road segment is within the field of view of the structure.

17. The non-transitory computer-readable medium of claim 16, wherein the processor-executable instructions further include processor-executable instructions to:
identify a third road segment that is within the field of view of the structure; and
determine that at least the threshold distance of the third road segment is not within the field of view of the structure,
wherein the processor-executable instructions, to store or output the information that identifies the first set of mobile devices, further include processor-executable instructions to exclude, from the stored or outputted information, information that identifies a third set of mobile devices that have been physically located on the third road segment and have not been physically located on the first road segment.

18. The non-transitory computer-readable medium of claim 4, wherein the processor-executable instructions further include processor-executable instructions to:
determine demographics information associated with the first set of mobile devices; and
determine content to present via the structure based on the demographics information associated with the first set of mobile devices.

19. The device of claim 1, wherein executing the processor-executable instructions further causes the one or more processors to:
determine demographics information associated with the first set of mobile devices; and
determine content to present via the structure based on the demographics information associated with the first set of mobile devices.

20. The method of claim 7, further comprising:
determining demographics information associated with the first set of mobile devices; and
determining content to present via the structure based on the demographics information associated with the first set of mobile devices.

* * * * *